United States Patent [19]

Schneider et al.

[11] Patent Number: 5,394,466
[45] Date of Patent: Feb. 28, 1995

[54] COMBINATION TELEPHONE NETWORK INTERFACE AND CABLE TELEVISION APPARATUS AND CABLE TELEVISION MODULE

[75] Inventors: Pina Schneider, Holmdel; Eric J. Hermsen, Howell; Frank S. Siano, Spotswood, all of N.J.

[73] Assignee: Keptel, Inc., Tinton Falls, N.J.

[21] Appl. No.: 18,327

[22] Filed: Feb. 16, 1993

[51] Int. Cl.[6] .......................................... H04M 11/00
[52] U.S. Cl. ...................................... 379/399; 379/412; 379/441
[58] Field of Search ............... 379/399, 397, 441, 442, 379/105, 412; 361/365, 357, 364, 362, 399; 307/140

[56] References Cited

U.S. PATENT DOCUMENTS

| | | | |
|---|---|---|---|
| 4,133,021 | 1/1979 | King et al. | 361/365 |
| 4,266,266 | 5/1981 | Samer | 361/357 |
| 4,785,376 | 11/1988 | Dively | 361/365 |
| 4,873,600 | 10/1989 | Vogele | 361/364 |
| 5,117,122 | 5/1992 | Hogarth et al. | 307/140 |
| 5,130,893 | 7/1992 | Straate et al. | 361/399 |
| 5,184,279 | 2/1993 | Horn | 361/399 |
| 5,196,988 | 3/1993 | Horn | 361/362 |
| 5,247,347 | 9/1993 | Litteral et al. | 379/105 |

*Primary Examiner*—James L. Dwyer
*Assistant Examiner*—M. W. Shehata
*Attorney, Agent, or Firm*—R. Gale Rhodes, Jr.

[57] ABSTRACT

Combination apparatus for connecting one or more incoming telephone company lines to one or more telephone subscriber premises lines and for connecting incoming cable television signals to a television set, and a cable television module for being mounted to telephone network interface apparatus and for connecting incoming cable television signals to a television set.

23 Claims, 4 Drawing Sheets

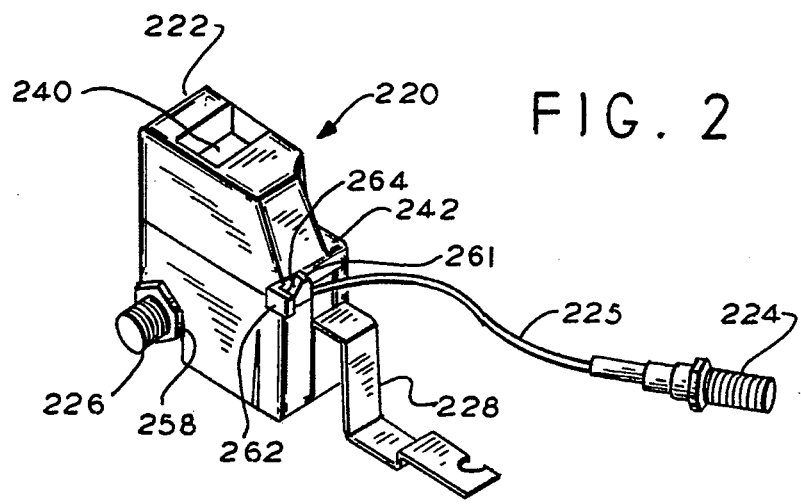
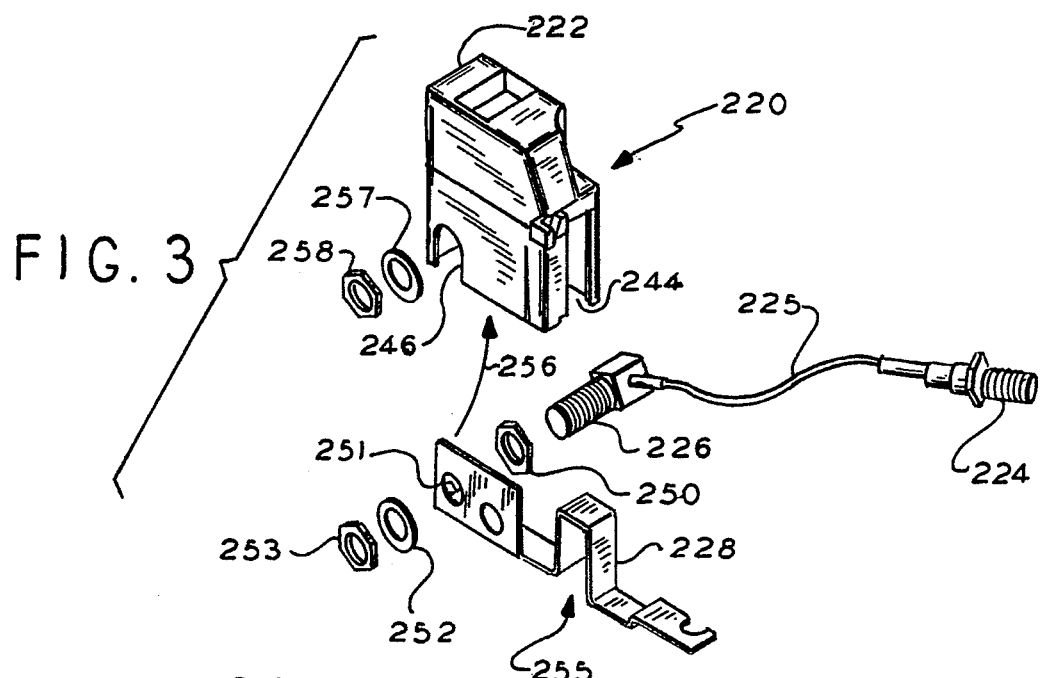
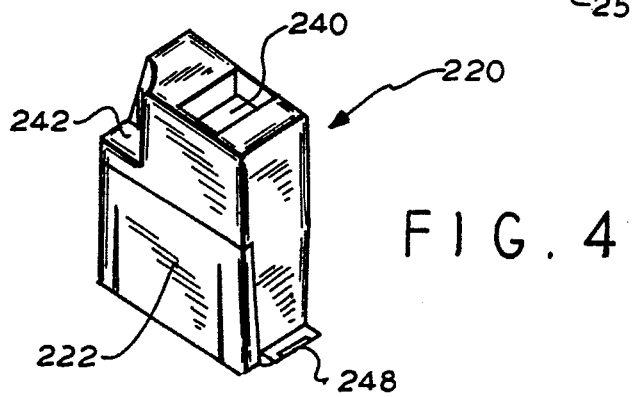

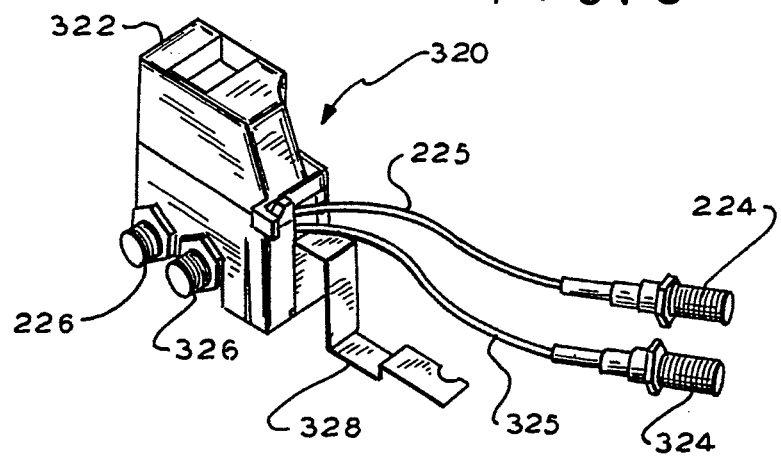
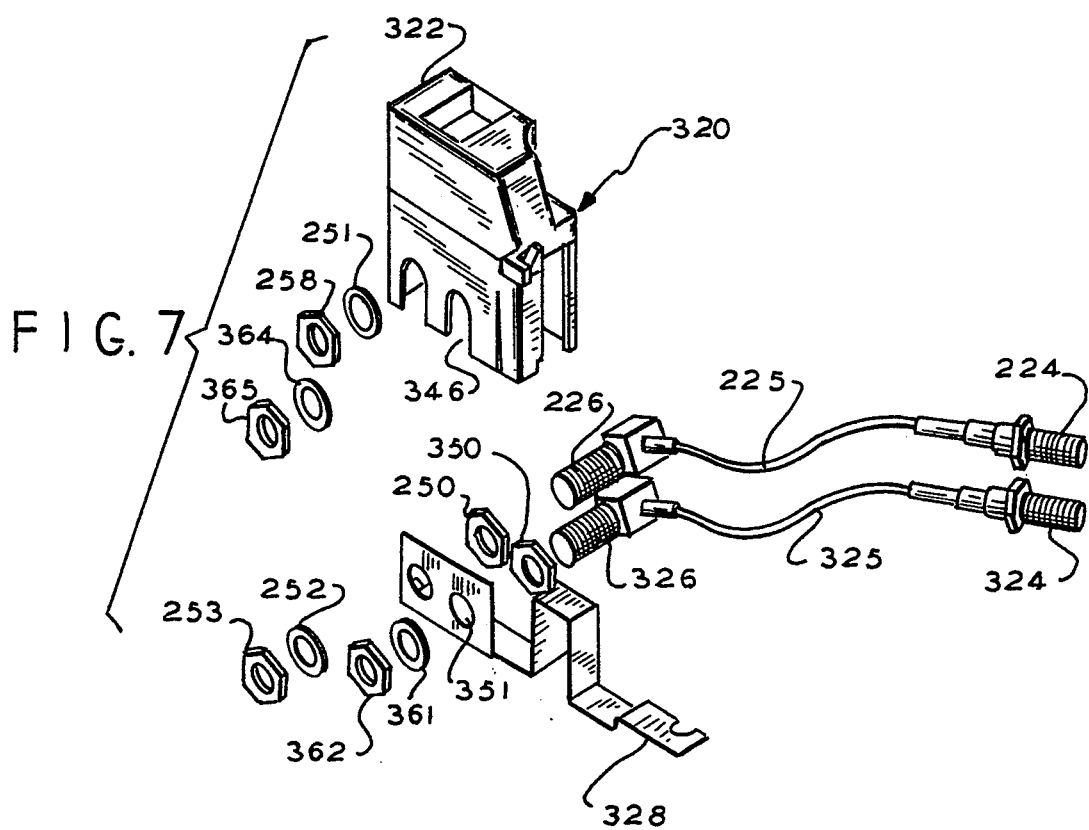

COMBINATION TELEPHONE NETWORK INTERFACE AND CABLE TELEVISION APPARATUS AND CABLE TELEVISION MODULE

BACKGROUND OF THE INVENTION

This invention relates to combination apparatus for connecting incoming telephone company wiring or lines to telephone subscriber premises wiring or lines and for connecting incoming cable television signals to a television set such as for example the television set of a telephone company subscriber or customer.

This invention further relates to a cable television module for being mounted, for example removably mounted, to telephone network interface apparatus through which one or more incoming telephone lines can be connected to one or more telephone subscriber's or telephone customer's telephones. The module is for connecting incoming cable television signals to a television set, for example a television set belonging to one of the telephone company subscribers or customers.

Numerous telephone network interface apparatus are known to the art for being mounted at a multiple dwelling such as an apartment house or condominium and which telephone network interface apparatus are for connecting one or more incoming telephone lines, typically a plurality of incoming telephone lines, to one or more telephone subscriber's or customer's telephones located at various apartments or condominiums comprising the multiple dwelling. Also known to the art are telephone network interface apparatus including one or more individual subscriber line modules, typically a plurality of such modules, with each individual subscriber line module for connecting one incoming telephone company line to one of the telephone customer's telephones. Such individual subscriber line modules, as known to the art, provide a demarcation point between a telephone subscriber's or customer's line and an incoming telephone line to facilitate the determination of whether a fault exists on the telephone customer or subscriber's line or the incoming telephone company line. Such telephone network interface apparatus and the individual subscriber line modules, as is also known to the art, are typically located in a common area, such as the basement of the apartment house or condominium, whereby a telephone repairman can make a ready determination of whether or not such fault exists on the telephone subscriber's line or the incoming telephone line whether the telephone subscriber or customer is home or not; such individual subscriber line module also permits the telephone customer or subscriber to make the determination of whether a fault exists on the telephone customer or subscriber's line or the incoming telephone company line. Examples of such telephone network interface apparatus and individual subscriber line modules are disclosed in U.S. Pat. No. 4,945,559, patented Jul. 31, 1990, entitled TELEPHONE NETWORK INTERFACE APPARATUS, and U.S. Pat. No. 4,979,209, patented Dec. 18, 1990 entitled INDIVIDUAL SUBSCRIBER LINE MODULE; Thomas J. Collins et al. are inventors of both patents and both patents are assigned to the same assignee as the present invention. These patents are incorporated herein by reference as if fully reproduced herein and U.S. Pat. No. 4,979,209 is referred to hereinafter as the "'209 patent."

Cable television signals are typically transmitted to a multiple dwelling over an optical fiber line which terminates at an optical network unit typically located curbside to the above-noted multiple dwelling. Typically a plurality of coaxial cables run from the optical network unit to the above-noted individual apartments or condominiums to connect the incoming cable television signals directly, or through a cable television channel selector, to the individual television sets of the cable television customers residing in the apartments or condominiums. Should one of such television sets fail to provide a television picture and audio signals or sound, a question arises in the mind of the television customer as to whether the television set is not working or whether cable television signals are not being received. The television customer typically calls the cable television company and reports the failure and then arrangements must be made to coordinate the time at which a cable television repairman can come to the television customer's apartment or condominium with the time at which the television customer is home. This is particularly difficult due to the fact that cable television repairmen typically work 8:00 or 9:00 a.m. to 5:00 p.m., and television customers, including husbands and wives, typically also work 8:00 or 9:00 a.m. to 5:00 p.m.

Accordingly, there exists a need in the art for apparatus for interconnecting a television customer's television set to incoming cable television signals which provides a demarcation point between such television set and the source of such cable television signals to permit a cable television repairman to make a reasonable determination as to whether or not the failure of the television set to provide a television picture and sound is due to the television set not working or the failure to receive incoming cable television signals, and to permit such cable television repairman to make such determination while the television customer is not present at the apartment or condominium.

There also exists a need in the art for such cable television apparatus providing such demarcation point and which permits the television customer to make a reasonable determination as to whether or not the failure of the television set to provide a television picture and sound is due to the television set not working or the failure to receive incoming cable television signals. If the determination indicates that the failure is due to the customer's television set not working, the customer has the television set repaired or replaced and avoids a service call from the cable television repairman and its needless attendant cost.

There further exists a need in the art for combination apparatus for connecting one or more incoming telephone company lines to one or more telephone subscribers' or customers' lines and for connecting incoming cable television signals to a cable television set which may be, for example, the television set of a telephone customer or subscriber.

SUMMARY OF THE INVENTION

It is the object of the present invention to satisfy the foregoing needs in the art.

Combination apparatus satisfying the foregoing needs and embodying the present invention may include a housing to which are mounted telephone connecting apparatus for connecting at least one incoming telephone line with a telephone subscriber premises line and cable television connecting apparatus for connecting incoming cable television signals with a television set; the telephone connecting apparatus may provide a demarcation point to facilitate determination of whether a fault exists on the incoming telephone line or the subscriber premises line and the cable television connection apparatus may provide a demarcation point or points for facilitating determination of whether the failure of a television set to provide a picture and sound is due to the television set not working or the failure to receive incoming cable television signals.

Cable television module satisfying the foregoing needs and embodying the present invention may be mounted, e.g. removably, to the above-noted telephone network interface apparatus such as disclosed in the '209 patent and which module is for connecting a cable television customer's television set, which cable television customer may also be a telephone customer or subscriber, with incoming cable television signals. The module provides a demarcation point, or demarcation points, for permitting the cable television customer and/or a cable television repairman, to make a reasonable determination as to whether the failure of the television set to provide a television picture and audio signals or sound is due to the television set not working or the failure to receive incoming cable television signals. By mounting the cable television module to such telephone network interface apparatus, which apparatus as noted above is typically mounted in a common area such as the basement of an apartment house or condominium, the cable television repairman can have access to the demarcation point for making the above-noted determinations whether the television customer is at home or not.

DESCRIPTION OF THE DRAWINGS

FIG. 2 is a perspective view of a first embodiment of a cable television module embodying the present invention and which module is shown in the assembled condition;

FIG. 3 is a perspective exploded view of the cable television module of FIG. 1 shown in the disassembled condition;

FIG. 4 is a reverse side view, in perspective, of the module housing shown in FIG. 3;

FIG. 6 is a perspective view of an alternate embodiment of a cable television module embodying the present invention and which module is shown in the assembled condition; and FIG. 7 is a perspective exploded view of the cable television module of FIG. 5 shown in the disassembled condition.

DESCRIPTION OF THE PREFERRED EMBODIMENTS

Figure 1:
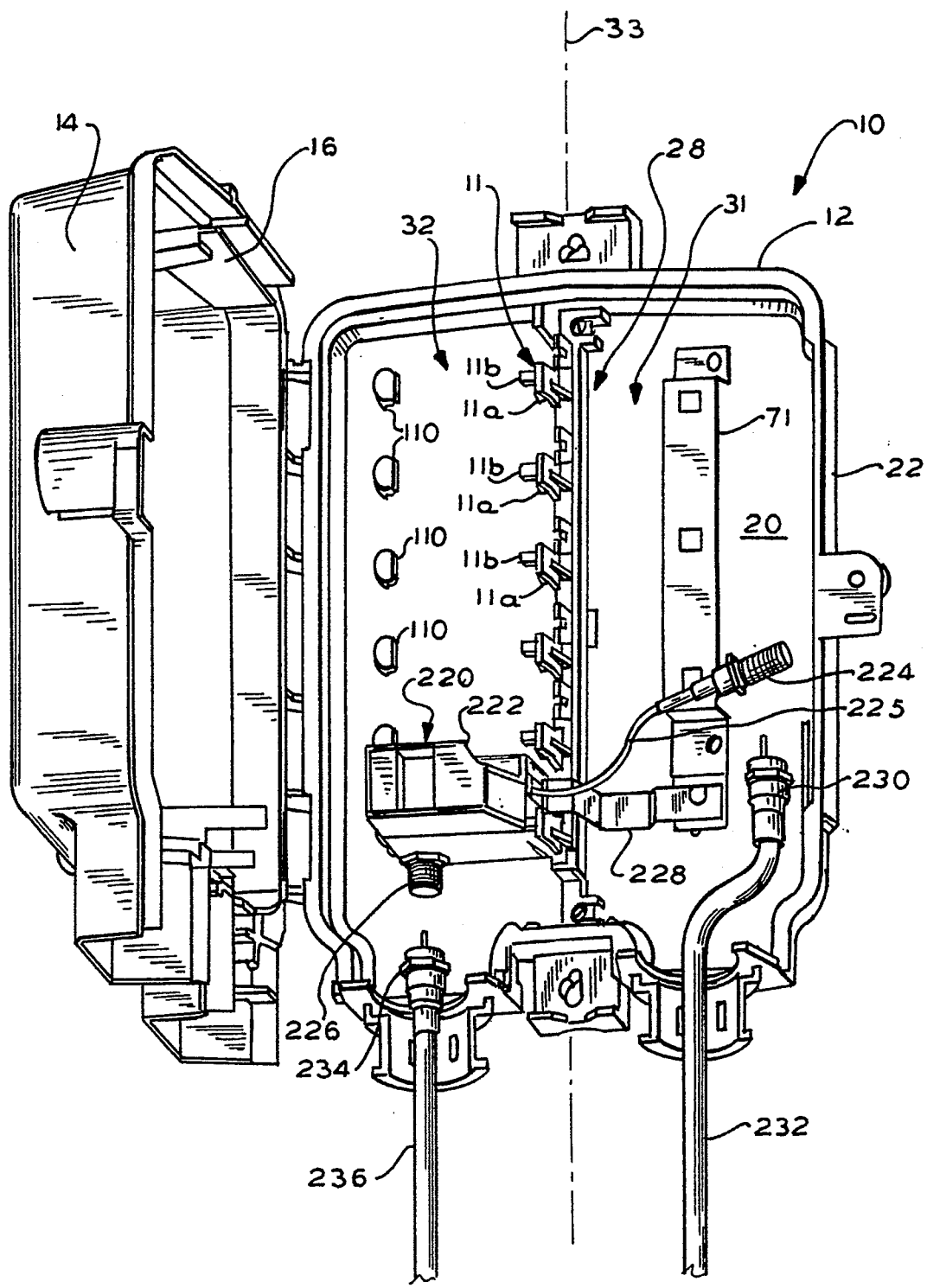
FIG. 1 is a front perspective view showing a cable television module embodying the present invention mounted to telephone network interface apparatus substantially the same as that disclosed in the '209 patent.

Referring to FIG. 1, it will be understood that the telephone network interface apparatus indicated by general numerical designation 10 is substantially the same as the telephone network interface apparatus disclosed in the '209 patent and also indicated by general numerical designation 10. Telephone network interface apparatus of FIG. 1 differs from that of the '209 patent in that it includes an upwardly extending module mounting or retaining member indicated by general numerical designation 11. For convenience of reference, the structural elements of the telephone network apparatus 10 of FIG. 1 corresponding to the same structural elements of the telephone network interface apparatus disclosed in the '209 patent have been given the same numerical designations as in the '209 patent and, although the '209 patent has been incorporated herein by reference, for convenience of reference a brief description of the primary structural elements of the telephone network interface apparatus 10 will be presented as well as a brief explanation of the functions of such primary structural elements.

The telephone network interface apparatus 10 of FIG. 1 comprises a housing including a base 12, a telephone company cover 14, and a subscriber cover 16. Base 12 includes a bottom 20 circumscribed by an upwardly extending wall 22 and the telephone company and subscriber covers 14 and 16 are mounted pivotally to the wall 22 as shown. The bottom 20 and wall 22 provide a compartment indicated by general numerical designation 28 and which compartment 28 is divided by the diagrammatical dividing line 33 into a telephone company compartment portion 31 and a telephone subscriber compartment portion 32. As taught in the '209 patent, the telephone company cover 14 is for being fastened only to the base 12 such as for example by a hex-headed screw, not shown, which is not easily removable by a subscriber and which requires a special type of tool not typically possessed by the subscriber but which tool is typically possessed by telephone company personnel to permit such telephone company personnel to unfasten the telephone company cover 14 from the base 12. The subscriber cover 16 is for being fastened only to the telephone company cover 14 such as for example by a screw not shown in FIG. 1. Such fastening denies the telephone customer or subscriber access to the telephone company compartment portion 31 but permits the telephone subscriber to unfasten the subscriber cover 16 from the telephone company cover 14 to gain access to the telephone subscriber compartment portion 32 which permits the telephone customer to have access to the demarcation point provided by the telephone customer's individual subscriber line module as taught in the '209 patent. Such fastening of the covers 14 and 16 also permits telephone company personnel to unfasten the telephone company cover 14 from the base 12 to thereby gain access to both the telephone company compartment 31 and the subscriber compartment 32 as is also taught in the '209 patent. A ground buss 71 is suitably mounted in the telephone company compartment 31, such as by screws not shown, and the ground buss is connected to earth ground by suitable means not shown as taught in the '209 patent. The module mounting-member 10 is mounted suitably to the bottom 20 of the base 12 such as by screws not shown, and extends upwardly therefrom generally along the dividing line 33. The module mounting or retaining member 11 includes a plurality of upwardly extending flexible members 11a each provided with an outwardly extending tab 11b for being received within a notch provided on the cable television modules embodying the present invention or which tab 11b is also for extending over and wedgedly engaging a portion of the individual subscriber line module 91 as shown in FIG. 6 and described in further detail below. The module mounting or retaining member 11 may be suitably mounted to the bottom 20 of the base 12 such as by screws not shown and may be made of a suitable plastic to provide the upwardly extending members 11b with suitable flexibility and resiliency; the member 11 may be made suitably such as for example by injection molding. A plurality of upwardly extending inverted L-shaped members 110 are provided on the bottom 20. As described in detail below the members 110 cooperate with the tabs 11b in mounting the cable television module 220 to the telephone network interface apparatus 10; members 110 are the members 110 shown in cross-sectional side view in FIG. 10 of the '209 patent.

A cable television module embodying the present invention and indicated by numerical designation 220 is shown mounted to the telephone network interface apparatus 10 in FIG. 1. Generally, the cable television module 220 includes a housing 222, a first female coaxial cable connector 224 interconnected by a length of coaxial cable 225 to a second female coaxial cable connector 226 and a ground bracket 228; the connectors 224 and 226 are externally threaded and such connectors and the ground bracket 228 are mounted to the housing 222 in a manner described in detail below and indicated diagrammatically in FIG. 3. Further generally, it will be understood that the female coaxial cable connector 224 is for being connected to the male coaxial cable connector 230 provided on the end of the coaxial cable 232 extending partially into the telephone network interface apparatus 10 and which coaxial cable 232 is for carrying incoming cable television signals from a suitable source. The female coaxial cable connector 226 is for being connected to the male coaxial cable connector 234 provided on the end of the coaxial cable 236 extending partially into the telephone network interface apparatus 10 and which coaxial cable 236 is for being connected to a television set not shown. Upon such connections being made, the television set is connected to the incoming cable television signals.

Referring now to FIGS. 2–4, and first in particular to FIGS. 2 and 4, the housing 222 is provided with a first indentation 240 extending inwardly of the top portion of the housing and a second indentation 242 extending inwardly into a top corner portion of the housing. As described in detail below, the indentation 240 facilitates removal or dismounting of the cable television module 220 from the telephone network interface apparatus 10 (FIG. 1) and the indentation 240 facilitates removal or dismounting of an individual subscriber line module, such as individual subscriber line module indicated by general numerical designation 91 in FIG. 6, from the telephone network interface apparatus 10 upon such individual subscriber line module 91 being mounted laterally of and in close proximity to the cable television module 220. The housing 222, FIG. 2, may be provided with members 261 and 262 providing a notch 264 therebetween for facilitating mounting Of the module 220 to the telephone network interface apparatus 10 as described below. As may be best understood by reference to FIG. 3, the female coaxial cable television connector 226 may be mounted to the ground bracket 228 by threading and tightening the internally threaded nut 250 over the externally threaded connector 226, inserting the connector 226 through the opening 251 formed in the ground bracket 238, placing the washer 252 over the connector 226 and threading and tightening the internally threaded nut 253 over the externally threaded connector 226 to provide a sub-assembly indicated by general numerical designation 255 in FIG. 3. The housing 222, as may be understood from FIG. 3, is also provided at its lower forward portion with an upwardly extending slot 244 for receiving a portion of the ground bracket 228 and is provided in its left side portion, as viewed in FIG. 3, with an upwardly extending slot 246 for receiving the connector 226. The sub-assembly 255 is inserted internally of the housing 222, as indicated by the arrow 256 in FIG. 3, with the ground bracket 228 extending outwardly of the housing 222 through the slot 244 (FIG. 3) as shown in FIG. 2 and with the female coaxial connector 226 extending outwardly through the slot 246 (FIG. 3) as shown in FIG. 2. Thereafter, the washer 257, FIG. 3, is placed over the connector 226 and the internally threaded nut 258, FIG. 3, is threaded over the connector 226, as shown in FIG. 2, and tightened to mount the sub-assembly 255 to the housing 222. It will be understood, from FIGS. 1 and 2, that the mounting of the connector 226 and ground bracket 228 to the housing 220 is in a manner such that the connector 226 and ground bracket 228 reside at least partially internally of the housing 220 and such that the connector 226 is available for being connected to the coaxial cable 236, FIG. 1, extending into the telephone network interface apparatus 10. Thus, such mounting causes the female coaxial cable connector 226 to extend out of the housing 222 sufficiently to permit the connector 226 to be connected to the male connector 234 provided on the end of the coaxial cable 236 (FIG. 1) and such mounting also causes the ground bracket 228 to extend out of the housing 222 sufficiently to permit the ground bracket to be suitably connected to the ground buss 71 in the telephone company compartment 31 to thereby connect the coaxial cable connectors 224 and 226 to earth ground.

Figure 5:
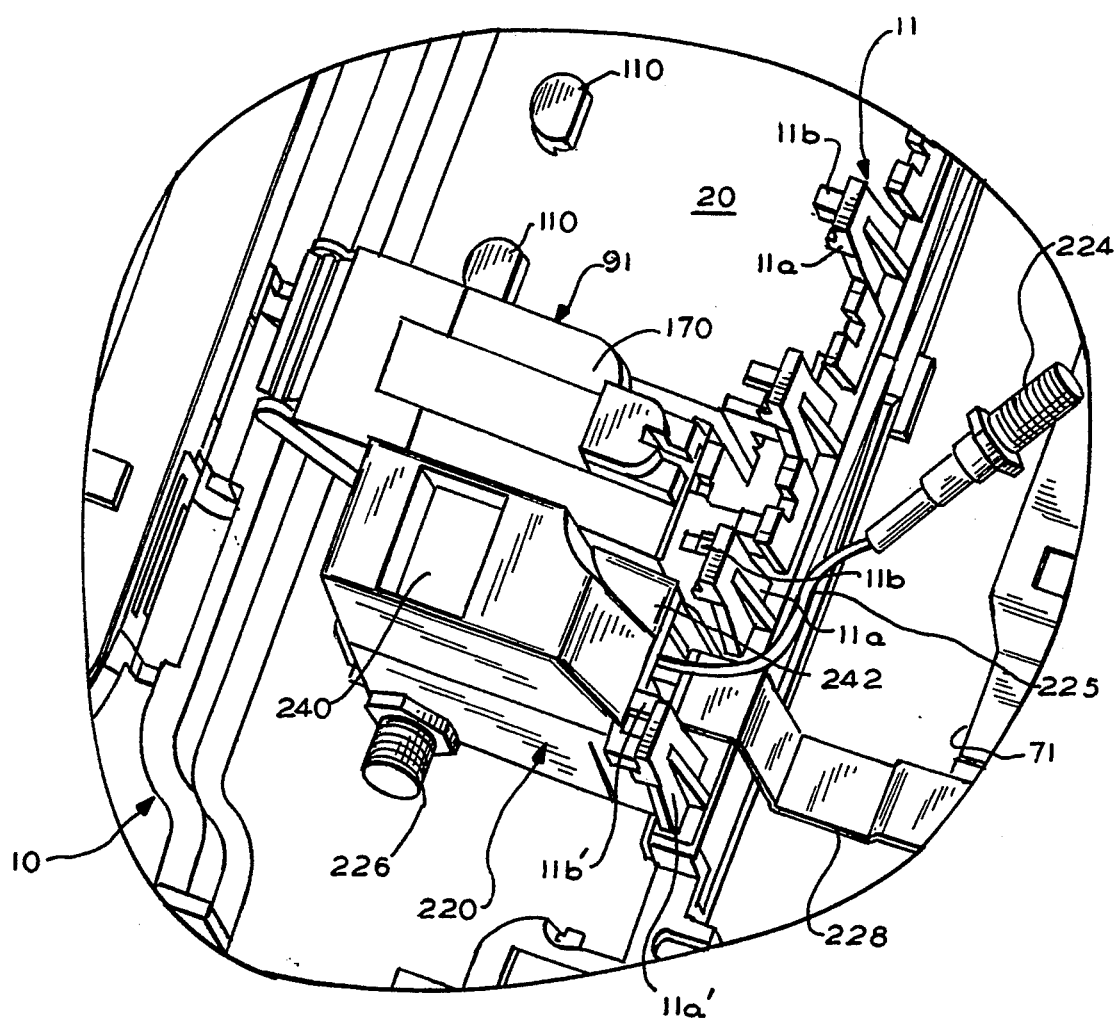
FIG. 5 is an enlarged view in perspective of a portion of FIG. 1 also showing an individual subscriber line module mounted to the telephone network interface apparatus laterally of and in close proximity to a cable television module of the present invention.

Referring to FIG. 4, the lower rear portion of the housing 222 of the cable television module 220 is provided with an outwardly extending member 248, and referring now to FIG. 5, the cable television module 220 is mounted removably to the bottom 20 of the telephone network interface apparatus 10 by pivoting the cable television module 220 leftwardly as viewed in FIG. 5 and by inserting the outwardly extending member 248 under one of the upwardly extending mounting members 110, as shown in FIG. 10 of the '209 patent, by manually bending or flexing the upwardly extending member 11a' rightwardly as viewed in FIG. 5, by pivoting the cable television module 220 rightwardly to place the notch 264 (FIG. 2) under the tab 11b' after which the member 11a' is released to allow the member 11a' to pivot leftwardly as viewed in FIG. 6 to permit the tab 11b' to enter and wedgedly engage the notch 264. To remove or dismount the cable television module 220 from the telephone network interface apparatus 10, the above-described mounting procedure is reversed and it will be understood that the indentation 238 formed in the top portion of the housing 222 may receive a portion of the thumb or finger of a person to facilitate pivoting of the cable television module 220 as described above to facilitate mounting and/or dismounting of the module to and from the telephone network interface apparatus 10.

As noted above and as is shown in FIG. 5, an individual subscriber line module 91, such as individual subscriber line module 91 shown in FIGS. 12–17 of the '209 patent and described in detail therein, may be mounted laterally of and in close proximity to the cable television module 220 and it will be understood that the individual subscriber line module 91 is mounted to the apparatus 10 by inserting an outwardly extending member, such as member 114 as shown in FIG. 10 of the '209 patent under one of the upwardly extending mounting members 110 and by the tab 11b" by the member 11a" being received in a corresponding notch provided in the module 91 or by the tab 11b" extending over a portion of the top 170 of the module 91. It will be further understood that the indentation 242 formed in the corner portion of the cable television housing 220 may receive a portion of the thumb or finger of a person to facilitate grasping of the individual subscriber line module 91 to facilitate the individual subscriber line module being pivoted leftwardly as viewed in FIG. 1 to facilitate its removal or dismounting from the telephone network interface apparatus 10.

It will be understood that the telephone network interface apparatus 10, cable module 20 mounted removably to the apparatus 10, and the individual subscriber line module 91 mounted removably to the apparatus 10 comprise an embodiment of the combination apparatus of the present invention for connecting incoming telephone company wiring or lines to telephone subscriber premises wiring or lines and for connecting incoming cable television signals to a television set.

Referring again to FIG. 1 and to the demarcation points referred to above, it will be understood that upon the television set of a cable television customer not working, which customer also may be a telephone subscriber or customer, the customer may unfasten and open the subscriber cover 16 and disconnect the female coaxial cable connector 226 from the male coaxial cable connector 234 to provide a demarcation point between the customer's television set and the source of incoming cable television signals. The customer may thereafter connect a second television set, such as for example a portable television set, to the female coaxial cable connector 226 and in the event that the second television set receives a television picture and sound, the customer may reasonably determine that the failure of the first television set to receive a television picture and sound is due to the first television set not working. On the other hand, upon the customer connecting the second television set to the female coaxial cable connector 226 and upon the failure of such second television set to provide a television picture and sound, the customer may make a reasonable determination that the failure of the first television set to work is due to the failure to receive incoming coaxial cable signals. Also, a cable television repairman, which upon the Regional Bell Operating Companies being able also to provide cable television signals in addition to telephone service may be also the telephone company repairman, may open the telephone company cover 14 and disconnect the female coaxial connector 224 and the male coaxial cable connector 230 to provide a demarcation point between the customer's television set and the incoming cable television signals. Such repairman may then connect suitable cable television signal test apparatus to the male coaxial cable connector 230 and in the event that such test apparatus indicates reception of incoming coaxial cable television signals the cable television repairman may make a reasonable determination that the failure of the customer's television set to provide pictures and sound is due to the set not working. Alternatively, if such cable television signal testing apparatus does not indicate reception of incoming cable television signals a reasonable determination is made that the failure of the customer's television set to provide picture and sound is due to the failure to receive incoming cable television signals. The cable television repairman may also disconnect the female coaxial cable connector 226 and male coaxial cable connector 234 to provide a demarcation point therebetween and thereafter connect the cable television signal testing apparatus to the female coaxial cable connector 226 and make a determination, after having made the preceding described determination, as to whether or not the cable television module 220 is working or not.

In the event that it is desired to connect or carry additional incoming cable television signals to the television set beyond the capacity of the coaxial cable 232 (FIG. 1) to carry cable television signals, an alternate embodiment cable television module of the present invention indicated by general numerical designation 320 and shown in FIGS. 6 and 7 may be utilized. Cable television module 320 is the same as cable television module 220 except that cable television module 320 includes additional coaxial cable connectors 324 and 326 interconnected by a length of coaxial cable 325 and the housing 322 includes a second inwardly extending slot 346, FIG. 7, for receiving the connector 326, additionally the ground bracket 328 includes an opening 351 for receiving the connector 326. It will be understood that the coaxial cable connector 226 is mounted to the ground bracket 328 and to the housing 322 as described above with regard to housing 322, and it will be further understood that the coaxial cable connector 326 is mounted to the ground bracket 328 and the housing 322 by the internally threaded nuts 350, 362, and 365 and the washers 361 and 364 in the same manner that the connector 226 is mounted to the ground bracket 228 and housing 222 of FIGS. 2 and 3 as described above. It will be further understood by referring to FIG. 6 that upon such mounting the female coaxial cable 326 resides at least partially internally of the housing 322 and extends outwardly of the housing sufficiently to permit the connector 326 to be connected to a coaxial cable, not shown, which would extend into the telephone subscriber compartment 32 of FIG. 1 and which would be connected to the television set. It will be further understood by reference to FIG. 5 that the coaxial cable connector 324 is made available for connection to an additional coaxial cable, not shown, which would extend into the telephone compartment 31 of FIG. 1 and which would carry additional incoming cable television signals from a suitable source. Such connections would permit additional incoming cable television signals to be carried to the television set.

It will be further understood that the female connectors 324 and 326 of FIG. 1 may be disconnected from the male coaxial cable connectors (not shown) of the coaxial cable described above for carrying the additional incoming cable television signals and for connecting such additional incoming cable television signals to the customer's cable television set to provide demarcation points in the same manner as described above with regard to the disconnection of the female connectors 224 and 226 from the male coaxial cable connectors 230 and 234.

Referring again to FIG. 7, it will be understood that the coaxial cable connectors 226 and 326 may be commercially available F type right angle female coaxial connectors, that the coaxial cable connectors 224 and 324 may be commercially available F type inline female coaxial cable connectors and that the lengths of coaxial cable 225 and 325 may be commercially available RG179 coaxial cable.

It will be understood by those skilled in the art that many modifications and variations may be made in this invention without departing from the spirit and the scope thereof.

What is claimed is:

1. Apparatus for connecting incoming cable television signals to a television set, comprising:
cable television module for being mounted to telephone network interface apparatus through which at least one incoming telephone line may be connected to at least one telephone customer's telephone, the telephone network interface apparatus including a ground buss for being connected to earth ground, said module including a housing and first and second cable television connectors interconnected to carry said cable television signals from said first connector to said second connector, said first connector for receiving said incoming television signals and said second connector for carrying said incoming cable television signals to said television set; and
ground connecting means for connecting said cable television module to said ground buss.

2. Apparatus according to claim 1 wherein said cable television module includes first mounting means and wherein said telephone network interface apparatus includes second mounting means, said first and second mounting means for cooperatively mounting said cable television module removably to said telephone network interface apparatus.

3. Apparatus according to claim 1 wherein said first and second connectors provide demarcation points between said television set and said incoming cable television signals to facilitate the determination of whether the failure of said television set to provide a picture and sound is due to said television set not working or due to the failure to receive said incoming cable television signals.

4. Cable television module for connecting a telephone customer's television set to incoming cable television signals, said module for being mounted to telephone network interface apparatus for connecting one or more telephone customer's telephones to one or more incoming telephone company lines, said telephone network interface apparatus provided with first mounting means and provided with a ground buss for being connected to earth ground, comprising:
housing means provided with second mounting means for being connected to said first mounting means to mount said housing means to said telephone network interface apparatus;
first and second cable television signal connecting means mounted to said housing means, said first and second cable television signal connecting means being interconnected to carry said incoming cable television signals from said first connecting means to said second connecting means;
said first connecting means for being connected to a first conductor of cable television signals extending into said telephone network interface apparatus, said first conductor for carrying said incoming cable television signals;
said second connecting means for being connected to a second conductor of cable television signals extending into said telephone network interface apparatus, said second conductor for carrying said incoming cable television signals to said television set; and
a ground member mounted to said housing and connected to said first and second connecting means and for being connected to said ground buss to connect said first and second connecting means to earth ground.

5. The module according to claim 4 wherein said cable television module also is for connecting additional incoming cable television signals to said telephone customer's television set, wherein said module further comprises third and fourth cable television signal connecting means mounted to said housing means, said third and fourth interconnecting means being interconnected to carry said additional incoming television signals from said third interconnecting means to said fourth interconnecting means, said third connecting means for being connected to a third conductor of cable television signals extending into said telephone network interface apparatus and said third conductor for carrying said additional incoming cable television signals, and said fourth connecting means for being connected with a fourth conductor of cable television signals extending into said telephone network interface apparatus and said fourth conductor for carrying said additional incoming cable television signals to said television set.

6. The module according to claim 4 wherein said first connecting means upon being disconnected from said first conductor provides a first demarcation point between said television set and said first conductor to permit a cable television repairman to connect test apparatus to said first conductor and upon said incoming cable television signals being indicated as received by said test apparatus a determination is made that the failure of said television set to provide a picture and sound is due to said television set not working and upon said test apparatus not receiving said incoming cable television signals a determination is made that the failure of said television set to provide said television picture and sound is due to the failure to receive said incoming cable television signals.

7. The module according to claim 4 wherein said second connecting means upon being disconnected from said second conductor provides a demarcation point between said television set and a source of said incoming cable television signals and upon a second television set being connected to said second conductor and said second television set providing a television picture and sound a determination is made that the failure of said television set to provide said television picture and sound is due to said television set not working and upon said second television set not providing a television picture and sound a determination is made that the failure of said television set to provide said television picture and sound is due to the failure to receive said incoming cable television signals.

8. Cable television module for being mounted removably to telephone network interface apparatus which telephone network interface apparatus is for connecting at least one telephone customer's telephone to at least one incoming telephone company line, said telephone network interface apparatus including a ground buss for being connected to earth ground, said module for connecting said telephone customer's television set to incoming cable television signals, comprising:
housing means, first mounting means, a ground bracket, and first and second cable television signal connecting means interconnected to carry said incoming television signals from said first connecting means to said second connecting means, said first mounting means for mounting said ground bracket and said second cable television signal connecting means to said housing means in a manner such that at least said ground bracket and said second cable television signal connecting means reside at least partially internally of said housing means and such that said first cable television signal connecting means is available for being connected to a first coaxial cable extending into said telephone network interface apparatus, said first coaxial cable for carrying said incoming cable television signals;

said second cable television signal connecting means extending outwardly of said housing means sufficiently to permit said second cable television signal connecting means to be connected to a second coaxial cable extending into said telephone network interface apparatus, said second coaxial cable for carrying said incoming cable television signals to said television set;

said ground bracket extending outwardly of said housing sufficiently to permit said ground bracket to be connected to said ground buss to connect said first and second cable television signal connecting means to earth ground; and said telephone network interface apparatus provided with second mounting means and said housing means provided with third mounting means for being connected to second mounting means to mount said module removably to said apparatus and to facilitate removal of said module from said apparatus to permit said module to be readily replaced by a second cable television module.

9. The module according to claim 8 wherein said first connecting means upon being disconnected from said first conductor provides a first demarcation point between said television set and said first conductor to permit a cable television repairman to connect test apparatus to said first conductor and upon said incoming cable television signals being indicated as received by said test apparatus a determination is made that the failure of said television set to provide a television picture and sound is due to said television set not working and upon said test apparatus not receiving said incoming cable television signals a determination is made that the failure of said television set to provide said television picture and sound is due to the failure of said television set to receive incoming cable television signals.

10. The module according to claim 8 wherein said second connecting means upon being disconnected from said second conductor provides a demarcation point between said television set and a source of said incoming cable television signals and upon a second television set being connected to said second connecting means and said second television set providing a television picture and sound a determination is made that the failure of said television set to provide said television picture and sound is due to said television set not working and upon said second television set not providing a television picture and sound a determination being made that the failure of said television set to provide said television picture and sound is due to the failure of said television set to receive said incoming cable television signals.

11. The module according to claim 8 wherein said housing means is provided with first removal means for facilitating disconnection of said third mounting means from said second mounting means to permit removal of said module from said telephone network interface apparatus.

12. The module according to claim 11 wherein said first removal means comprises a first indentation extending inwardly of said housing means.

13. The apparatus according to claim 12 wherein said housing means includes a top portion and wherein said first indentation extends inwardly of said top portion.

14. The module according to claim 8 wherein said telephone network interface apparatus is for having at least one individual subscriber line module mounted removably thereto laterally of and in close proximity to said cable television module, said individual subscriber line module for connecting said telephone customer's telephone with said incoming telephone company line, and wherein said cable television module is provided with second removal means for facilitating removal of said individual subscriber line module from said telephone network interface apparatus.

15. The module according to claim 14 wherein said second removal means comprise a second indentation extending inwardly of said housing means to permit a person's finger to be extended at least partially therein to facilitate gripping and removal of said individual subscriber line module from said telephone network interface apparatus.

16. The module according to claim 15 wherein said housing means includes a top corner portion and wherein said second indentation extends inwardly of said top corner portion.

17. The module according to claim 8 wherein said module also is for connecting additional incoming television signals to said telephone customer's television set, said module further comprising third and fourth cable television signal connecting means interconnected to carry said additional incoming television signals from said third connecting means to said fourth connecting means, said third and fourth connecting means for being mounted to said housing means by fourth mounting means in a manner such that said third connecting means is available for being connected to a third coaxial cable extending into said telephone network interface apparatus and in a manner such that said fourth cable television signal connecting means resides at least partially internally of said housing means, said third coaxial cable for carrying said additional incoming television signals, and said fourth cable television signal connecting means extending outwardly of said housing means sufficiently to permit said fourth cable television signal connecting means to be interconnected to a fourth coaxial cable extending into said telephone network interface apparatus and which fourth coaxial cable is for carrying said additional incoming cable television signals to said television set.

18. Combination apparatus for interconnecting at least one incoming telephone company line with at least one telephone subscriber line and for interconnecting incoming cable television signals with a television set, comprising:

a housing provided with a ground buss for being connected to earth ground;

telephone connecting apparatus mounted in said housing and for interconnecting said incoming telephone company line with said telephone subscriber line;

cable television connecting apparatus mounted in said housing and for connecting said incoming cable television signals with said television set; and ground connecting means for connecting said cable television connecting apparatus to said ground buss.

19. The apparatus according to claim 18 wherein said housing is provided with first mounting means and wherein said telephone connecting apparatus is provided with second mounting means and wherein said first and second mounting means are for mounting said telephone connecting apparatus removably to said housing, and wherein said housing is provided with third mounting means and wherein said cable television connecting means is mounted with fourth mounting means and wherein said third and fourth mounting are for mounting said cable television connecting means removably to said housing.

20. Apparatus for connecting incoming cable television signals to a television set, comprising:
cable television module for being mounted to telephone network interface apparatus through which at least one incoming telephone line may be connected to at least one telephone customer's telephone, the telephone network interface apparatus including first ground connecting means for being connected to earth ground, said module including a housing and first and second cable television connectors interconnected to carry said cable television signals from said first connector to said second connector, said first connector for receiving said incoming television signals and said second connector for carrying said incoming cable television signals to said television set; and
second ground connecting means for being connected to said first ground connecting means to connect said cable television module to earth ground.

21. Cable television module for connecting a telephone customer's television set to incoming cable television signals, said module for being mounted to telephone network interface apparatus for connecting one or more telephone customer's telephones to one or more incoming telephone company lines, said telephone network interface apparatus provided with first mounting means and provided with first ground connecting means for being connected to earth ground, comprising:
housing means provided with second mounting means for being connected to said first mounting means to mount said housing means to said telephone network interface apparatus;
first and second cable television signal connecting means at least one of which connecting means is mounted to said housing means, said first and second cable television signal connecting means being interconnected to carry said incoming cable television signals from said first connecting means to said second connecting means;
said first connecting means for being connected to a first conductor of cable television signals extending into said telephone network interface apparatus, said first conductor for carrying said incoming cable television signals;
said second connecting means for being connected to a second conductor of cable television signals extending into said telephone network interface apparatus, said second conductor for carrying said incoming cable television signals to said television set; and
second ground connecting means mounted to said housing and connected to said first and second connecting means and for being connected to said first ground connecting means to connect said first and second connecting means to earth ground.

22. Cable television module for being mounted removably to telephone network interface apparatus which telephone network interface apparatus is for connecting at least one telephone customer's telephone to at least one incoming telephone company line, said telephone network interface apparatus including first ground connecting means for being connected to earth ground, said module for connecting said telephone customer's television set to incoming cable television signals, comprising:
housing means, first mounting means, a ground bracket, and first and second cable television signal connecting means interconnected to carry said incoming television signals from said first connecting means to said second connecting means, said first mounting means for mounting said ground bracket and said second cable television signal connecting means to said housing means in a manner such that at least said ground bracket and said second cable television signal connecting means reside at least partially internally of said housing means and such that said first cable television signal connecting means is available for being connected to a first coaxial cable extending into said telephone network interface apparatus, said first coaxial cable for carrying said incoming cable television signals; said second cable television signal connecting means extending outwardly of said housing means sufficiently to permit said second cable television signal connecting means to be connected to a second coaxial cable extending into said telephone network interface apparatus, said second coaxial cable for carrying said incoming cable television signals to said television set;
said ground bracket extending outwardly of said housing sufficiently to permit said ground bracket to be connected to said first ground connecting means to connect said first and second cable television signal connecting means to earth ground; and
said telephone network interface apparatus provided with second mounting means and said housing means provided with third mounting means for being connected to second mounting means to mount said module removably to said apparatus and to facilitate removal of said module from said apparatus to permit said module to be readily replaced by a second cable television module.

23. Combination apparatus for interconnecting at least one incoming telephone company line with at least one telephone subscriber line and for interconnecting incoming cable television signals with a television set, comprising:
a housing provided with first ground connecting means for being connected to earth ground;
telephone connecting apparatus mounted in said housing and for interconnecting said incoming telephone company line with said telephone subscriber line;
cable television connecting apparatus mounted in said housing and for connecting said incoming cable television signals with said television set; and
second ground connecting means for being connected to said first ground connecting means for connecting said cable television connecting apparatus to earth ground.

* * * * *